United States Patent [19]

Fujita

[11] 4,005,484
[45] Jan. 25, 1977

[54] AUTOMATIC STOPPER FOR MULTITRACK RECORDER

[75] Inventor: Tadashi Fujita, Ishikawa, Japan

[73] Assignee: Electromechanics Research, Durham, N.C.

[22] Filed: May 28, 1975

[21] Appl. No.: 581,678

[52] U.S. Cl. .................................................. 360/74
[51] Int. Cl.² ........................................ G11B 15/02
[58] Field of Search ................................ 360/74, 78

[56] References Cited
UNITED STATES PATENTS 3,800,316  3/1974  Kuharchuk .................... 360/74

*Primary Examiner*—Robert S. Tupper
*Attorney, Agent, or Firm*—B. B. Olive

[57] ABSTRACT

A multitrack tape recorder is provided with a set of pushbutton stop switches and associated circuitry adapted to preset the recorder to stop playing or recording at the end of any desired channel.

4 Claims, 12 Drawing Figures

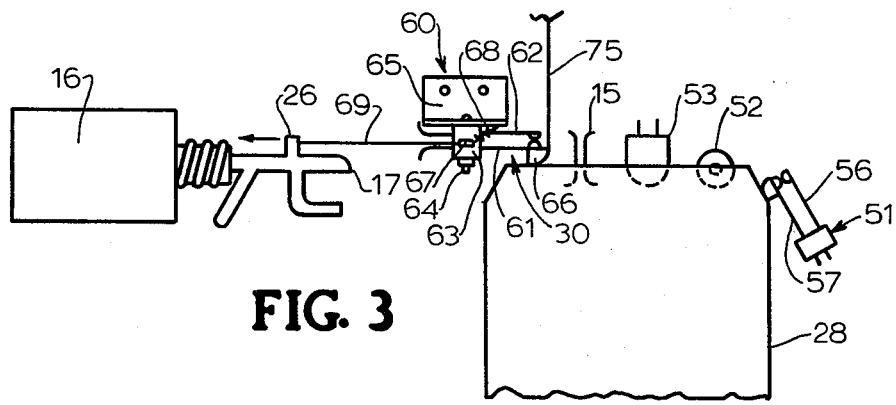
FIG. 3
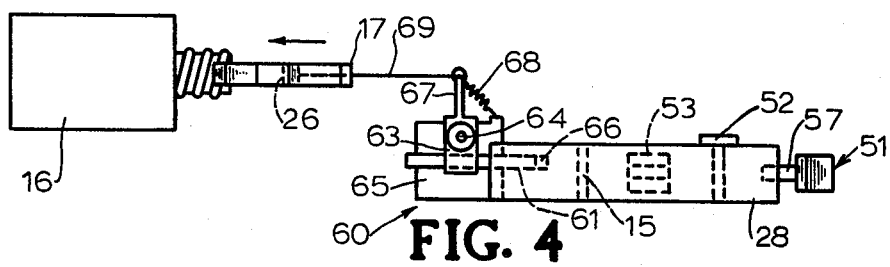
FIG. 4
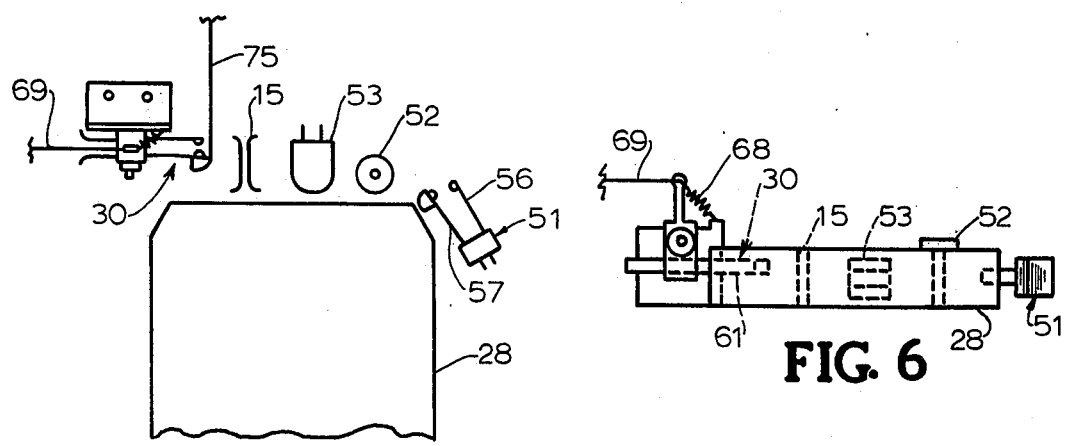
FIG. 5
FIG. 6

AUTOMATIC STOPPER FOR MULTITRACK RECORDER

BACKGROUND OF THE INVENTION

1. Field of the Invention

The invention relates to devices for selectively changing channels and stopping play or recording in tape recorders using multitrack endless tape. In particular, the invention provides means for presetting an eight-track recorder to stop the recording or playing-back mechanism at the end of any desired channel.

2. Description of the Prior Art

The endless tape systems of the prior art, an example of which is the eight-track cartridge system, are typically designed to operate consecutively from one channel to another when the cartridge is fully inserted and to continue such consecutive play until the cartridge is manually removed or otherwise rejected. In this typical endless, consecutive operation, it is difficult to synchronize the end of a recording period with the end of a given channel. For example, if the operator wants to record on channel 1 and save the recording on channels 2, 3, and 4, it is highly desirable that the recorder stop exactly at the end of channel 1. The recorders of the prior art require the operator to supervise the recording and when the tape reaches the end of channel 1, he must pull out the cartridge or otherwise stop the recording. Otherwise, the consecutive changing to channel 2 would result in erasing what is stored on channel 2.

The eight-track recorders of the prior art generally provide up to three different modes of operation: "one", "all", and "repeat". In the "one" mode, any one channel is played (or recorded), the recorder stops at the end of that channel, and the cartridge is rejected. In the "all" mode, the recorder plays (or records) continuously until the end of channel 4 at which time it stops and rejects the cartridge. In the "repeat" mode, the recorder plays (or records) continuously. In order to accomplish these inflexible stopping modes, most prior art recorder incorporate expensive and complicated amplification circuitry with transistors, SCR's, diodes, resistors and capacitors.

It is believed that no prior art recorder provides means for starting the recorder at any selected point, playing channels consecutively, and presetting the recorder to stop after any desired channel and without requiring that the cartridge be rejected. Thus, there is an acute need for a programmed stopper providing a simple circuit which enables the user to preset the recorder to stop after any channel after playing up to four consecutive channels and without requiring that the cartridge be rejected.

SUMMARY OF THE INVENTION

In a preferred embodiment, the present invention includes a starter switch, a set of four pushbutton stop switches, and a high resistance stop indicator light which are added to the channel changing circuitry of a conventional continuous-play, eight-track, i.e., four channel, recorder. Each pushbutton stop switch corresponds to one of the four channels. By manually pressing one of the switches, the recorder is automatically programmed to stop playing or recording at the end of the selected channel but without rejecting the cartridge. When the recorder is stopped, the stop indicator light glows and the power to the capstan motor is cut off until the starter switch is closed. The system of the present invention can be easily added to the channel changing circuitry of an existing recorder or, in an alternative embodiment, it can be built in as an integral part of the original recorder circuitry.

DESCRIPTION OF THE DRAWINGS

FIG. 3 is a top view of the starter switch assembly and associated components with the switch shown in a closed position and with the tape cartridge fully inserted.

FIG. 4 is a side view of the starter switch assembly and tape cartridge shown in FIG. 3.

FIG. 5 is a top view of the starter switch assembly with the switch shown in an open position and with the cartridge partially, but not fully, inserted and with the solenoid plunger not being shown.

FIG. 6 is a side view of the starter switch assembly and tape cartridge as shown in FIG. 5.

DESCRIPTION OF THE PREFERRED EMBODIMENT

Figure 1:
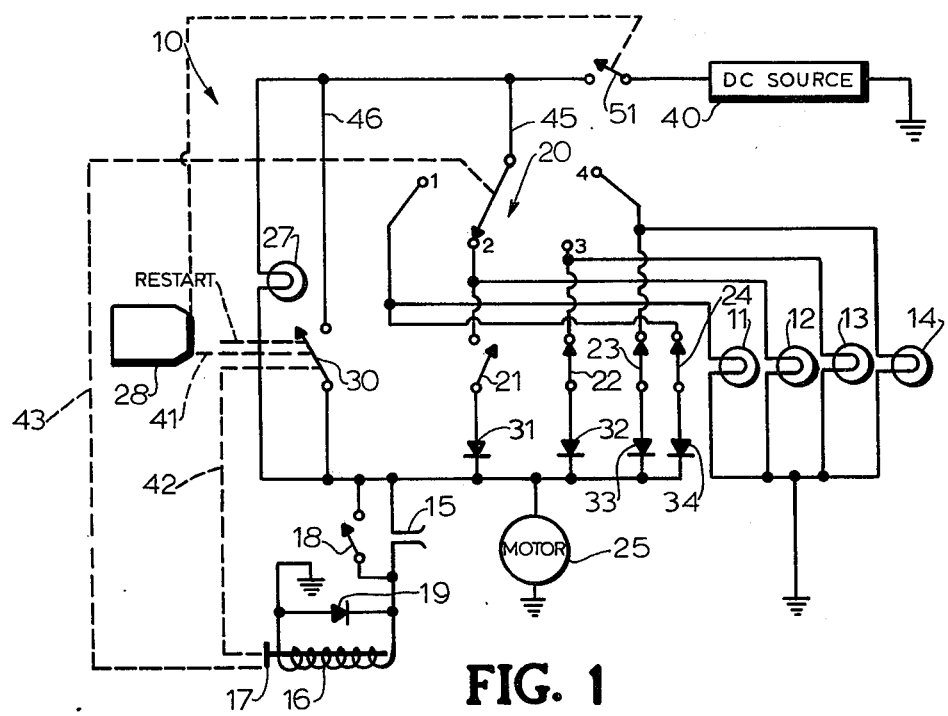
FIG. 1 is a circuit diagram of one embodiment of the invention circuitry in a form adapted to be added to a conventional eight-track recorder and with the pushbutton circuitry illustrated in a configuration arranged to stop on channel 2.

Referring to FIG. 1, a general circuit diagram of the programmable automatic stopper 10 as added to a conventional eight-track recorder includes the conventional D.C. source 40 adapted to drive capstan motor 25 through either of parallel lines 45, 46. A power switch 51 is adapted to be closed by the insertion of the tape cartridge 28. D.C. source 40 is connected to motor 25 by line 46 through a normally open starter switch 30. Switch 30 is closed by insertion of the tape cartridge 28, as indicated by line 41 in FIG. 1, and can be opened either by the removal of cartridge 28 or by a mechanical linkage 42 connected between switch 30 and a conventional solenoid plunger 17. The operation of switch 30 is later described in more detail. Motor 25 can also be energized through line 45, rotary switch 20, and either of switches 21, 22, 23, 24, when closed. As shown in FIG. 1, switch 20 is a rotary switch which indexes between contacts 1, 2, 3, and 4 and is actuated by a mechanical linkage 43 connected to plunger 17. The position of switch 20 corresponds to the number of the channel which is playing or recording, e.g., switch 20 is indexed to contact 3 at the same time the magnetic head 53 (FIGS. 3–8) shifts to record on (or play) channel 3. One of channel indicator lights 11, 12, 13, 14 glows according to the position of switch 20. Switch 20, lights 11, 12, 13, 14 and the channel position of magnetic head 53 (FIG. 3) may be controlled by solenoid 16 and plunger 17 with any of the mechanisms well known to those skilled in the art and which do not, per se, form part of the invention. One such control mechanism is described in U.S. Pat. No. 3,564,157 and the typical prior art circuit may be referred to in FIG. 12.

The construction and operation of the channel switching circuitry will now be explained with reference to the circuit diagram of FIG. 1. In this regard, it may be noted that solenoid 16 which activates plunger 17 is connected to the D.C. source 40 through parallel switches 15 and 18. Sensor switch 15 comprises a pair of sensing contacts which detect the position of the conducting foil adhered to the end of each channel of the magnetic tape. Switch 15 is momentarily closed at the end of each channel. Normally open switch 18 is a manually operable channel changing switch. When either switch 15 or switch 18 is momentarily closed, a pulse is directed through solenoid 16 to activate plunger 17. A diode 19 is connected in parallel with solenoid 16 and aids in reducing noise. The movement of plunger 17 is transmitted through mechanical linkage 43 and causes rotary switch 20 to index and causes the magnetic head 53 (FIG. 3) to progress by one channel in a manner well known to those skilled in the art. The movement of plunger 17 is also transmitted through a separate mechanical linkage 42 and causes starter switch 30 to be opened by moving the starter switch in a vertical plane as later described. Thus, each time either switch 15 or switch 18 is closed, starter switch 30 is put in an open position, and magnetic head 53 and rotary switch 20 are sequentially advanced.

Figure 7:
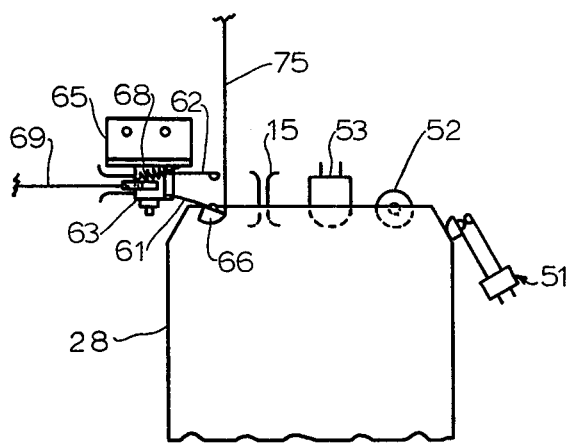
FIG. 7 is a top view of the starter switch assembly with the switch shown after it has been mechanically opened by the solenoid plunger (not shown).
Figure 8:
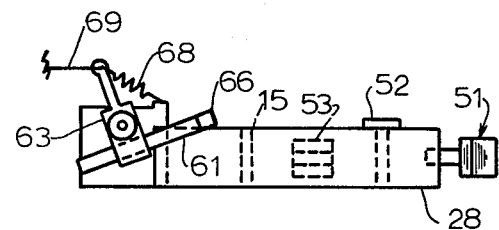
FIG. 8 is a side view of the starter switch assembly and tape cartridge as shown in FIG. 7.

The construction and operation of the novel starter switch assembly 60 of the invention and the associated recorder components will now be described with reference to FIGS. 3–8. As shown in FIG. 3, the complete insertion of tape cartridge 28 closes power switch 51 by forcing together its contact blades 56, 57. Switch 51 is connected to D.C. source 40; therefore, it must be closed for motor 25 to operate. Motor 25, which is not shown in FIGS. 3–8, is adapted to turn a capstan 52 which in turn drives the magnetic tape past the magnetic head 53 and sensor switch 15. Starter switch assembly 60 also includes starter switch 30 having contact blades 61, 62. Blades 61, 62 are secured to a rotatable member 63 for pivoting on a horizontal axis about a pin 64. A fixed block member 65 receives pin 64 and provides support for assembly 60. A lever arm 67 extends vertically from rotatable member 63. A spring 68 is fixedly secured at one end to the top of lever arm 67 and at the other end to block member 65. Spring 68 is adapted to hold lever arm 67 in the vertical position. Also connected to the top of lever arm 67 is a flexible wire or string 69. Wire 69 is connected to plunger 17 and is thus momentarily pulled each time plunger 17 is activated. Wire 69 and its associated linkages to plunger 17 and switch 30 comprise the previously mentioned mechanical linkage 42. The pull of wire 69 elongates spring 68 and causes switch contact blades 61, 62 to pivot about pin 64 and to be raised above the top level of cartridge 28 (FIGS. 7 and 8). The resiliency of switch contact blade 61 results in blade 61 separating from contact blade 62 so that bumper 66 rests on the top surface of cartridge 28. Switch 30 is now open and will remain open provided the restart button 71 is not pressed as described later.

Figure 2:
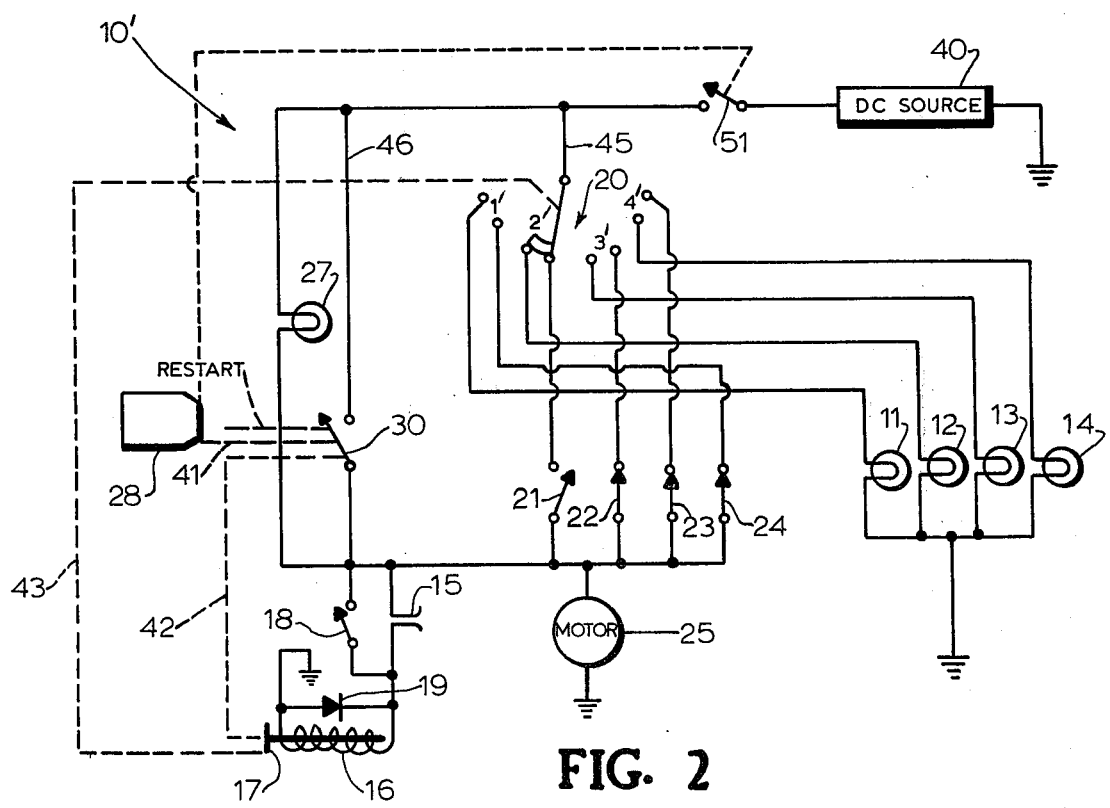
FIG. 2 is a circuit diagram of a second embodiment of the invention circuitry adapted to be made as an integral part of an eight-track recorder in the original equipment.

As previously mentioned, the mechanical linkage 42 indicated in FIGS. 1 and 2 includes wire 69 which is connected to plunger 17 of solenoid 16. Plunger 17 is shown more fully in FIGS. 3 and 4 and in the embodiment being described is a type of plunger found in the typical eight-track recorder and which is used for activating the channel changing mechanism. Through components which are not shown but which are well known to those skilled in the art, plunger 17 moves magnetic head 53 and indexes rotary switch 20 (FIG. 1) each time the channel changes. In the preferred embodiment of the present invention, wire 69 is secured to a small projection 26 on plunger 17. During channel changing, when the plunger 17 is moved in the direction of the arrows in FIGS. 3 and 4, wire 69 is given a momentary pull and opens switch 30 in the manner described above. Those skilled in the art will readily realize that wire 69 can be connected to virtually any portion of the channel changing mechanism which moves during channel changing. The path of wire 69 can be easily controlled by bending it around posts or by directing it through pulleys. It has been found that virtually all channel changing mechanisms have a moving part to which wire 69 can be secured to accomplish the objective.

Figure 11:
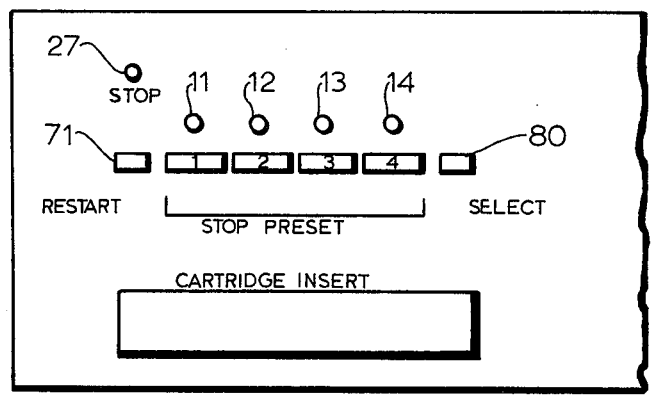
FIG. 11 is a front view of the front panel of an eight-track recorder incorporating the stop switch pushbuttons, stop indicator light and restart button of the present invention.

FIG. 11 illustrates a portion of a front panel of an eight-track recorder which incorporates the present invention. The panel includes four stop preset pushbuttons 1, 2, 3, 4 corresponding to switches 21, 22, 23, 24, respectively. Pushbuttons 1, 2, 3, 4 are selected to be of a type designed to remain in a depressed position after being pushed, and when depressed each button opens its corresponding switch 21, 22, 23, 24. Pushbuttons 1, 2, 3, 4 are also so selected to be of a type provided with an automatic release so that only one button can be in the depressed position at a time. Also, such pushbutton switches can be manipulated so that none will be depressed which allows all of switches 21–24 to be closed simultaneously. Pushbutton switches of this type are known and readily available to those skilled in the art. The select button 80 shown in FIG. 11 is a manually operable channel changing button which, when depressed, closes switch 18 in FIG. 1 through appropriate mechanical linkage, not shown. Stop indicator light 27 (FIG. 1) is also included on the front panel (FIG. 11) along with the channel indicator lights 11, 12, 13, 14 seen in FIG. 1. A restart button 71, later described, is also seen in FIG. 11 and is provided for restarting the recorder after it has been stopped at the end of a channel by the apparatus of the present invention.

Stop indicator light 27 (FIG. 1) is of relatively high resistance and is adapted to glow whenever both parallel lines 45 and 46 are open circuited so that only nominal power is being supplied to motor 25. In this case, light 27 will glow by conducting a nominal current, e.g., 30 milliamps. This reduced current will ground through motor 25; however, the typical recorder motor 25 will not operate with such a nominal current. When motor 25 is being energized through either of parallel circuits 45 or 46, the circuit through light 27, because of its relatively high resistance, acts essentially as an open circuit and light 27 does not glow.

The operation of an eight-track recorder incorporating the programmable stop feature of the present invention will now be described and which will be followed by a description of the restart circuitry and its operation. Before a cartridge is inserted into the recorder, both starter switch 30 and power switch 51 are in their normally opened positions as seen in FIG. 5. By inserting the cartridge completely into the recorder, the operator closes both switches 30 and 51 thereby starting capstan motor 25. Capstan motor 25 drives the tape past magnetic head 53 for playing or recording in the conventional manner. If the operator wishes to use the recorder as a continuously recording or playing device, he can do so by simply not depressing any of the four auxiliary stop buttons on the front panel. When none of the pushbuttons are depressed, switches 21–24 are all closed and motor 25 may be energized through line 45 in any position of rotary switch 20, since each contact 1, 2, 3, 4 of rotary switch 20 will connect to a closed circuit. In this mode, the recorder can be stopped simply by removing the cartridge and thereby opening power switch 51. The continuous play mode just described can be seen to correspond to the continuous play circuitry of the prior art shown in FIG. 12.

The invention circuitry comes into more useful operation when the operator wishes to have the recorder stop after it has played or recorded a selected channel. For this purpose, he pushes one of pushbuttons 1, 2, 3, 4 corresponding to that channel and which opens the corresponding switch 21, 22, 23 or 24. The recorder is now programmed to play or record until the selected channel has been completed, at which time rotary switch 20 will index to an open circuit and switch 30 will have been opened through the mechanical linkage 42. For example, FIG. 1 shows the operational state when the operator has pressed pushbutton number 1 (FIG. 11) which opens switch 21 and programs the recorder to stop at the end of channel 1. FIG. 1 also illustrates the situation when the tape has come to the end of channel 1 and the channel changer has indexed rotary switch 20 to contact 2 which opens the motor driving circuitry through line 45 and switch 21. Switch 30 is simultaneously opened by the mechanical linkage 42 which opens the motor driving circuit through line 46 and switch 30. Thus, in this situation, motor 25 cannot be energized through either of lines 45 or 46. Stop indicator light 27 is now energized and glows and light 12 for channel 2 is energized and glows to indicate the next channel after stoppage.

Auxiliary switch 30 provides several functions. As one function, switch 30 allows the operator to preset the recorder to play or record on up to four consecutive channels before it is stopped by one of open switches 21, 22, 23 or 24. Without switch 30, the recorder could play only three consecutive channels. For example, if the operator wanted to play channels 3, 4, 1, 2 in succession and to have the recorder stop after channel 2, he would insert the cartridge, push select button 80 to close switch 18 (FIG. 1) until rotary switch 20 indexed to contact 3 for playing channel 3, and then depress stop pushbutton 2. By depressing pushbutton 2, he would open switch 22 and thereby open the circuit between contact 3 and motor 25 so that the recorder would stop unless motor 25 had an alternate power supply. However, the recorder may play channel 3 even though switch 22 is open since motor 25 can, in this situation, be energized through parallel line 46 and switch 30. Since switch 30 was closed by the insertion of the cartridge 28, as previously described, it will remain closed until the channel changes to channel 4 at which time switch 30 is opened by the mechanical linkage 42, previously described. At this time, the motor can be energized through rotary switch 20, its contact 4 and switch 23.

Figure 9:
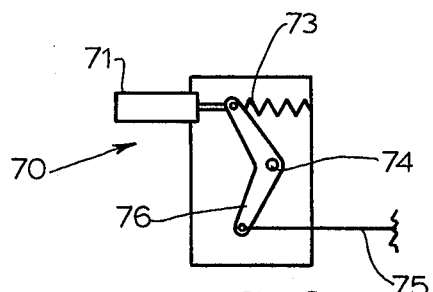
FIG. 9 is a cut-away side view of the restart button with the restart wire linkage shown in a relaxed state.

Another function of switch 30 is its restart function. When the recorder has been stopped by one of switches 21, 22, 23, or 24 being open as shown, for example, in FIG. 1, the recorder can be restarted to continue consecutive play by closing the starter switch 30. Of course, switch 30 can be closed by removing and reinserting cartridge 28. However, to avoid having to remove cartridge 28, the recorder circuitry of the invention is provided with a restart mechanism 70 which is next described and which is adapted to close switch 30 by pushing the restart button 71 illustrated in FIGS. 9, 10 and 11.

Figure 10:
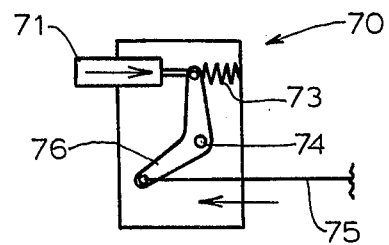
FIG. 10 is a cut-away side view of the restart button of FIG. 9 with the button pushed in and the restart wire linkage in a taut state.

Mechanism 70 includes a restart button 71 which is secured to a spring 73. Button 71 is also connected to the top of crank arm 76 which is adapted to pivot around pin member 74. Linkage wire 75 is connected to the bottom of arm 76. When the button 71 is manually depressed by the operator as depicted in FIG. 10, spring 73 is compressed and arm 76 pivots about pin 74. This pivoting moves the bottom portion of arm 76 so that wire 75 is pulled toward button 71. As best shown in FIG. 7, wire 75 is connected to bumper 66 of switch 30 so that when the restart button 71 is pushed, wire 75 will pull bumper 66 off of the top of cartridge 55 which allows contacts 61, 62 of switch 30 to close as shown in FIG. 2. For convenience, the restart button 71 is mounted on the front panel of the recorder as seen in FIG. 11.

Figure 12:
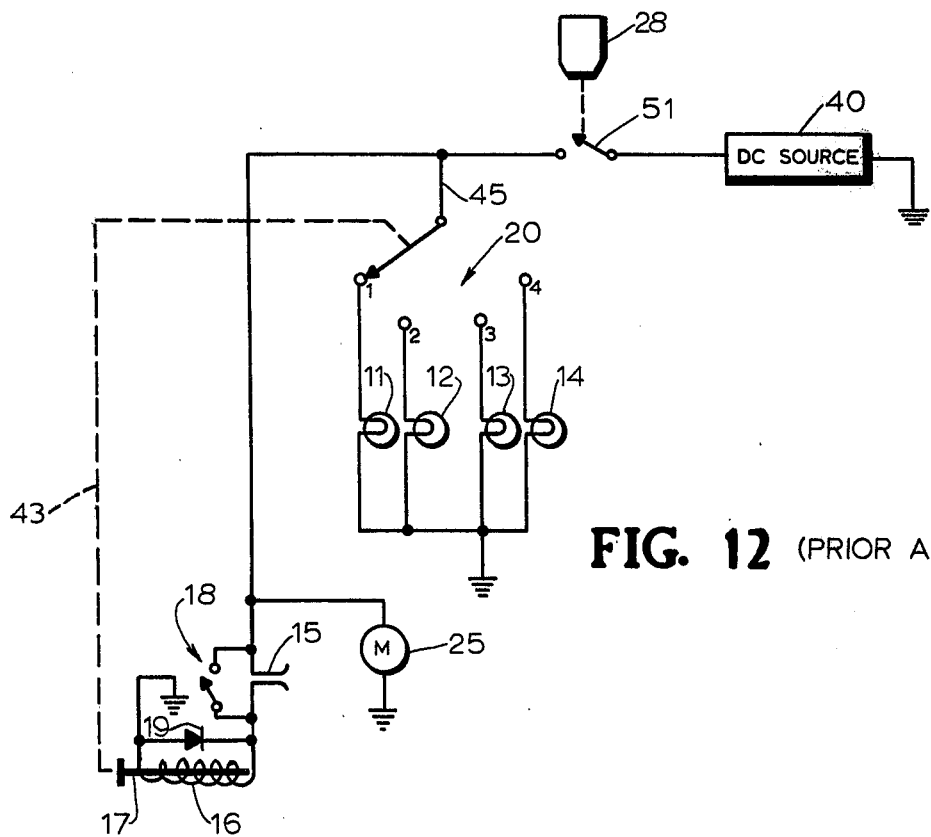
FIG. 12 is a circuit diagram of a prior art eight-track recorder adapted for continuous play.

The preferred embodiment of the invention as shown in FIG. 1 requires the addition of only a few simple components to the prior art circuitry of FIG. 12. Switches 21, 22, 23, 24 are added and, as previously explained, serve to connect rotary switch contacts 1, 2, 3, 4 to motor 25. Diodes 31, 32, 33, 34 assure that only one panel indicator light 11, 12, 13, 14 will be lit at any given time. Switch 30 is added to serve the various functions previously explained. In particular, it facilitates starting motor 25 when there is an open circuit between rotary switch 20 and motor 25.

FIG. 2 illustrates an alternative embodiment in which the invention is integrated into the original equipment design of an eight-track recorder. The circuitry is the same as shown in FIG. 1 except that double point contacts 1', 2', 3', 4' eliminate the necessity for diodes 31, 32, 33, 34 since only one panel indicator light 11, 12, 13, 14 can be lit at a time.

In summary, it can be seen that with very simple modifications to the conventional circuitry, the conventional recorder is made far more useful both for playing and recording. Thus, the operator is now able to preset the recorder to stop playing or recording at the end of any desired channel. In addition to differences already noted, it should be appreciated that the sequential, rotary switch was used in the prior art solely for the purpose of controlling the energization of the channel indicator lights. The present invention utilizes the rotary switch not only for this function, but also for connecting the power source to the capstan motor through the pushbutton stop switches of the invention and thereby enabling the operator to preset the recorder to automatically stop at the end of a selected channel.

What is claimed is:

1. In a cartridge type player-recorder using a multi-track forming multi-channel endless tape with detectable channel ends and having:
   a. a magnetic tape head operatively associated with said tape at a position adjacent thereto;
   b. shifting means for shifting said head from channel to channel;
   c. drive means for driving said tape past said head;
   d. automatic control means including means for sensing the end of each respective channel on said tape during movement thereof and actuator means operative in response thereto to actuate said shifting means in correspondence with sensing of each said channel end;
   e. manual control means including manual switching and associated circuit means for operating said actuator and shifting means independent of said sensing means for shifting said head to a selected said channel;
   f. a power source for powering said shifting, drive, automatic control, and manual control means; and
   g. a first normally-open switch operable to being closed in response to insertion of said cartridge and being placed in series connection with said source;
   an improved tape drive shut-off circuitry means comprising, in combination:
   h. a set of parallel lines one being assigned for each said channel, each said line having an electrical connection on one side to said drive means;
   i. sequential switching means operable with each operation of said actuator means for establishing and sequentially stepping a connection between the opposite side of each said line and said source through said first switch and in sequential correspondence with said head shifting from channel to channel;
   j. a plurality of normally-closed manual channel stop selector switches each being in series with one of said lines, said selector switches being adapted for operating either all closed or one open enabling a selected one of such lines to be open circuited to prevent the playing of the channel corresponding thereto by opening the respective manual switch connected therein; and
   k. an auxiliary switch connected on one side to said source through said first switch and on the opposite side to said drive means and operable for being closed in response to insertion of said cartridge and for being opened in response to withdrawal of said cartridge and independently to being opened in response to each operation of said actuator means without disturbing the inserted position of said cartridge thereby providing an auxiliary path for energizing said drive means from said source when said auxiliary switch is closed, one of said selector switches is open and said sequential switching means has stepped to the line connection having said open selector switch therein, whereby said player-recorder may be operated in a continuous mode by leaving all said selector swtiches closed and said cartridge depressed or in a mode in which said player-recorder is stopped at the end of a selected channel by opening the said selector switch in the line corresponding to the channel next following the last channel desired to be played and allowing said player-recorder to operate until said sequential switching means steps to the line connection having such open selector switch.

2. The apparatus of claim 1 including manual operator means allowing for resetting of said auxiliary switch to a closed position while said cartridge remains inserted.

3. The apparatus of claim 1 wherein each respective said selector switch includes a manual operator button bearing indicia corresponding to a channel at the end of which playing is desired to be stopped and each switch corresponding to such indicia is placed in the said line corresponding to the next successive channel so as to prevent the playing thereof when open.

4. The apparatus of claim 1 wherein said auxiliary switch includes a rotatable member and said rototable member mounts a pair of movable contacts providing an electrical path through said auxiliary switch, said auxiliary switch being operatively associated with said automatic control means such that said rotatable member when in one position with said contacts closed rotates in response to operation of said automatic control means to open said contacts to open the circuit through said auxiliary switch.

* * * * *